(12) United States Patent
Kambites et al.

(10) Patent No.: US 8,041,919 B2
(45) Date of Patent: Oct. 18, 2011

(54) STORING DATA BLOCKS TO MAXIMIZE THE AMOUNT OF STORAGE SPACE USED IN A STORAGE DEVICE

(75) Inventors: Carl D. Kambites, Chandler's Ford (GB); Ronald J. Venturi, Littleton (GB)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 12/254,988

(22) Filed: Oct. 21, 2008

(65) Prior Publication Data
US 2009/0113150 A1    Apr. 30, 2009

(30) Foreign Application Priority Data
Oct. 26, 2007   (EP) .................................... 07119413

(51) Int. Cl.
*G06F 12/02* (2006.01)

(52) U.S. Cl. ........ 711/171; 711/112; 711/202; 711/217; 711/E12.002

(58) Field of Classification Search .................. None
See application file for complete search history.

(56) References Cited

U.S. PATENT DOCUMENTS

| 5,113,512 | A | * | 5/1992 | Miki et al. ..................... 711/206 |
| 5,278,703 | A | * | 1/1994 | Rub et al. ......................... 360/51 |
| 5,603,002 | A | * | 2/1997 | Hashimoto .................... 711/113 |
| 5,887,199 | A | | 3/1999 | Ofer et al. |
| 6,668,304 | B1 | * | 12/2003 | Satran et al. ................... 711/112 |
| 7,039,758 | B2 | | 5/2006 | Mannen et al. |
| 2002/0059276 | A1 | * | 5/2002 | Loon et al. ..................... 707/100 |
| 2006/0282634 | A1 | * | 12/2006 | Ohtsuka ......................... 711/167 |

* cited by examiner

*Primary Examiner* — Matt Kim
*Assistant Examiner* — Ralph A Verderamo, III
(74) *Attorney, Agent, or Firm* — Lieberman & Brandsdorfer, LLC

(57) ABSTRACT

A method of storing data blocks onto sectors of a storage device comprises determining a specific number n of blocks, where n is greater than 1, storing n blocks consecutively onto consecutive sectors, such that each block begins directly after the previous block ends, repositioning the storing at the beginning of the next sector, and storing a further n blocks consecutively onto consecutive sectors, such that each block begins directly after the previous block ends.

18 Claims, 4 Drawing Sheets

STORING DATA BLOCKS TO MAXIMIZE THE AMOUNT OF STORAGE SPACE USED IN A STORAGE DEVICE

BACKGROUND OF THE INVENTION

1. Technical Field

This invention relates to a method and system for storing data blocks onto sectors of a storage device. More specifically, the method and system can be used for optimizing disk drives for variable block-size applications.

2. Description of the Prior Art

When storing information in a computer, a storage device such as a disk drive will have a plurality of sectors that store blocks of data. Serial Advanced Technology Attachment disk drives (SATA) use a rigid 512 bytes per sector format. However, many applications require a larger block size, for example, 520 bytes or 524 bytes, and to use these applications with SATA disk drives requires an intermediate mapping step in which these larger blocks are "mapped" across a number of the fixed sized 512 byte sectors of the SATA disk drive. The design of the mapping layer is critical to the intended application.

Simple mapping algorithms mean that the larger blocks will start and end at various offsets into a 512-byte sector. This makes the most efficient use of the available capacity of the SATA disk drive, but will lead to a substantial performance penalty during data write operations. For some applications performance is not an important consideration, and so this maximum-capacity mapping is appropriate. For other applications where performance is a priority, there is a different mapping algorithm which is less efficient with respect to the memory capacity of the SATA disk drive.

For example, consider an application which uses 524 byte blocks but wants to store these on a SATA disk drive which has 512 byte sectors. The application requires a method of mapping the 524 byte blocks onto the 512 byte sectors of the drive. There are two known methods of mapping the blocks onto the sectors. The first of these can be considered to be a maximum capacity mapping. If the application needs to maximize the capacity available on the drive, the most obvious mapping method simply maps adjacent blocks directly onto adjacent sectors giving a result which looks like this:

Block A occupies from Sector 01 offset 00 to Sector 02 offset 12
Block B occupies from Sector 02 offset 13 to Sector 03 offset 24
Block C occupies from Sector 03 offset 25 to Sector 04 offset 36
Block D occupies from Sector 04 offset 37 to Sector 05 offset 48
Block E occupies from Sector 05 offset 49 to Sector 06 offset 64
. . .

With this mapping, the application can read any range of blocks by simply using the implied algorithm to find the sector where the required range starts and ends, reading that span of sectors from the disk and then shifting out the unwanted data according to the offsets. However, when the application writes a range of blocks, there is an additional problem. For example, to write Block "C" in the mapping above, the application will be writing sectors 03 and 04 on the disk—but sector 03 also contains data for Block "B" and sector 04 also contains data for Block "D", so it will be necessary to first read those two sectors, then overlay the new data for Block "C" without changing the data for Blocks "B" and "D", and then re-write the two sectors to the drive. It is this "read/modify/write" process which causes the performance penalty because it requires the same sectors to be under the read/write heads twice, which implies an extra revolution of the disk drive.

The second known mapping technique is a max performance mapping, disclosed in U.S. Patent Publication No. 2006/0117161 to Venturi. If the application needs to maximize the performance available from the disk drive, the application has to avoid the read/modify/write cycles described above, and an appropriate mapping would simply consume two sectors of the disk for each 524-byte block, as shown below:

Block A occupies from Sector 01 offset 00 to Sector 02 offset 12
Block B occupies from Sector 03 offset 00 to Sector 04 offset 12
Block C occupies from Sector 05 offset 00 to Sector 06 offset 12
Block D occupies from Sector 07 offset 00 to Sector 08 offset 12
Block E occupies from Sector 09 offset 00 to Sector 10 offset 12
. . .

With this mapping, reads and writes of any range of blocks will always start on a sector boundary, and will never include data from any block outside the range. This will mean that the read/modify/write problem of the previous mapping method is avoided, and there is therefore no need to use two rotations of the disk drive every time a write function is used to store data on the storage device. Of course, as a result of starting each block of data at a new sector, every second sector will include a large amount of "unused" data space (after offset 12 in the second sector) so this mapping methodology produces a far less efficient use of the available capacity, with almost 50% of the available storage space being unused.

It is therefore an object of the invention to improve upon the known art.

SUMMARY OF THE INVENTION

In one aspect of the invention, a method is provided for storing data blocks onto sectors of a storage device. A specific number of blocks, n, is determined to be stored consecutively onto consecutive sectors. Storage of each of the determined number of blocks begins directly after the previous block ends. The storing of the blocks is repositioned at the beginning of the next sector. A further number of specified blocks are stored consecutively onto consecutive sectors, such that each block begins directly after the previous block ends.

In another aspect of the invention, a system is provided to store data blocks onto sectors of a storage device. A control device is provided in communication with the storage device. The control device is arranged to determine a specific number n of blocks to be consecutively stored onto consecutive sectors of the storage device. The consecutive storage ensures that each block begins directly after the previous block ends. Storage of blocks are repositioned at the beginning of the next sector. A further number of specified blocks are stored consecutively onto consecutive sectors, such that each block begins directly after the previous block ends.

In yet another aspect of the invention, a computer program product is provided with a computer readable medium with instructions to store data blocks onto sectors of a storage device. Instructions are provided to determine a specific number n of blocks to be stored, where n is greater than 1, and to store the blocks consecutively onto consecutive sectors, such that each block begins directly after the previous block ends.

Instructions are further provided to reposition the storing at the beginning of the next sector, and to store a further quantity of blocks consecutively onto consecutive sectors, such that each block begins directly after the previous block ends.

Other features and advantages of this invention will become apparent from the following detailed description of the presently preferred embodiment of the invention, taken in conjunction with the accompanying drawings.

BRIEF DESCRIPTION OF THE DRAWINGS

Embodiments of the present invention will now be described, by way of example only, with reference to the accompanying drawings, in which.

DESCRIPTION OF THE PREFERRED EMBODIMENT

Figure 1:
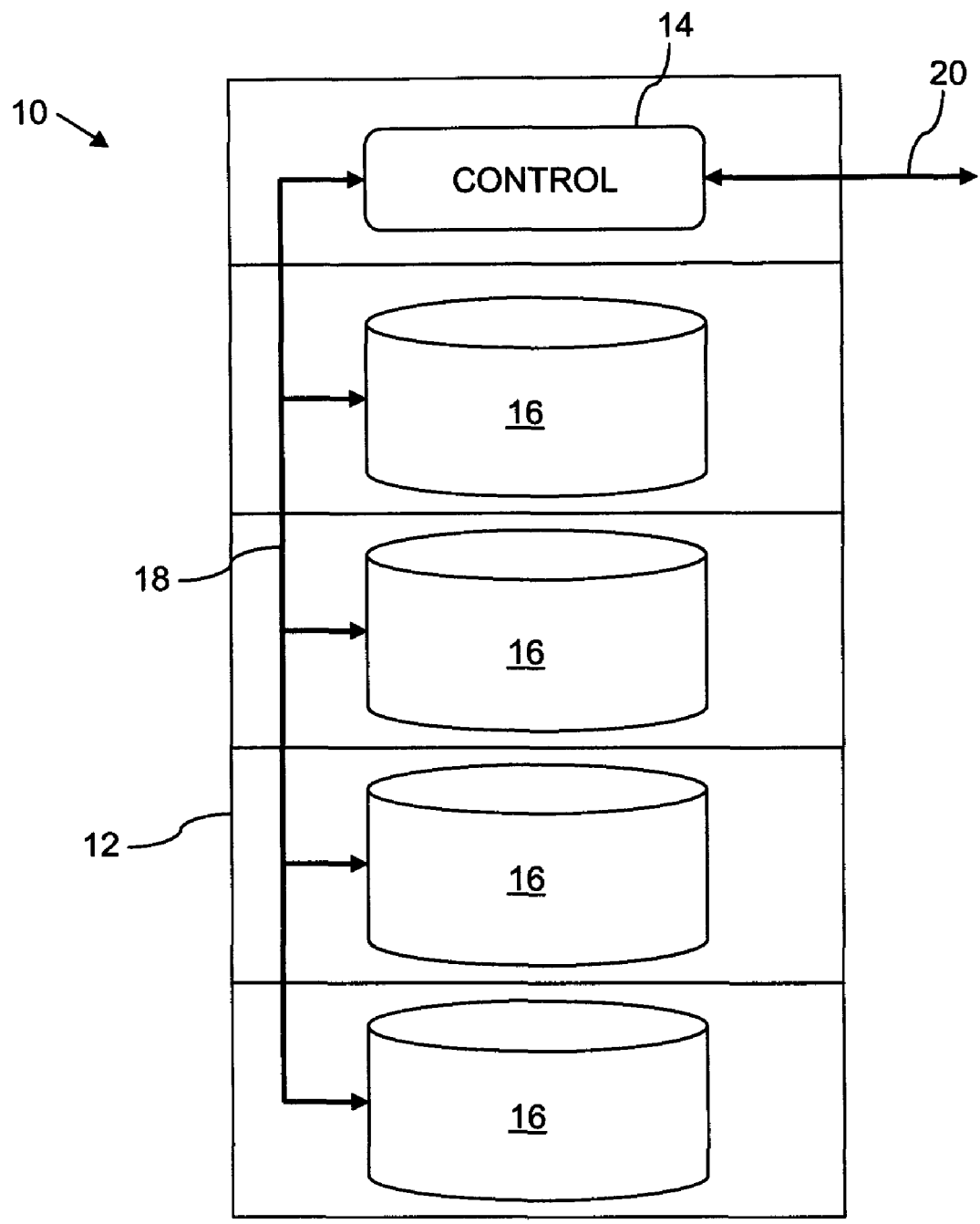
FIG. 1 is a schematic diagram of a system for storing data.

A prior art storage system (10) is shown in FIG. 1, which comprises an array (12) comprising a control device (14) and multiple storage devices (16). The system (10) is for storing data blocks onto sectors of a storage device (16). The control device (14) communicates with the storage devices (16) via an internal bus (18), and data is sent to and received from the control device (14) via an external bus (20). The system (10) shown in FIG. 1, is a typical server array (12) of multiple storage devices (16). In one embodiment, a single storage device (16) could be provided, for example internally within a desktop computing device.

The storage devices (16) are conventional off-the-shelf disk drives such as SATA disk drives, which have a fixed sector size of 512 bytes. These devices (16) are used because they are relatively cheap and operate efficiently. They are very commonly deployed in storage solutions provided in networks, such as might be used in a businesses' internal computing network as their intranet. The SATA drive creates a problem for many applications, through the fact that the sectors that make up the storage device 16 have a fixed size.

When the control device (14) is instructed by an external device, over the external bus (20), to store data blocks in a storage device (16), then the control device (14) will check whether a mapping function is needed to re-arrange the data blocks so that they can be stored by a storage device (16). This mapping function is required if the size of the data blocks is not the same as the 512 byte sector size that is specified by the SATA disk drive (16). For example, if the data received for storage is in blocks of 524 bytes, then the control device (14) needs to map the received data bytes onto the sectors of the storage device (16).

This is achieved by the control device (14) being arranged to determine a specific number n of blocks, where n is greater than 1, to store n blocks consecutively onto consecutive sectors, such that each block begins directly after the previous block ends, and then to reposition the storing at the beginning of the next sector, and store a further n blocks consecutively onto consecutive sectors, such that each block begins directly after the previous block ends.

Figure 2:
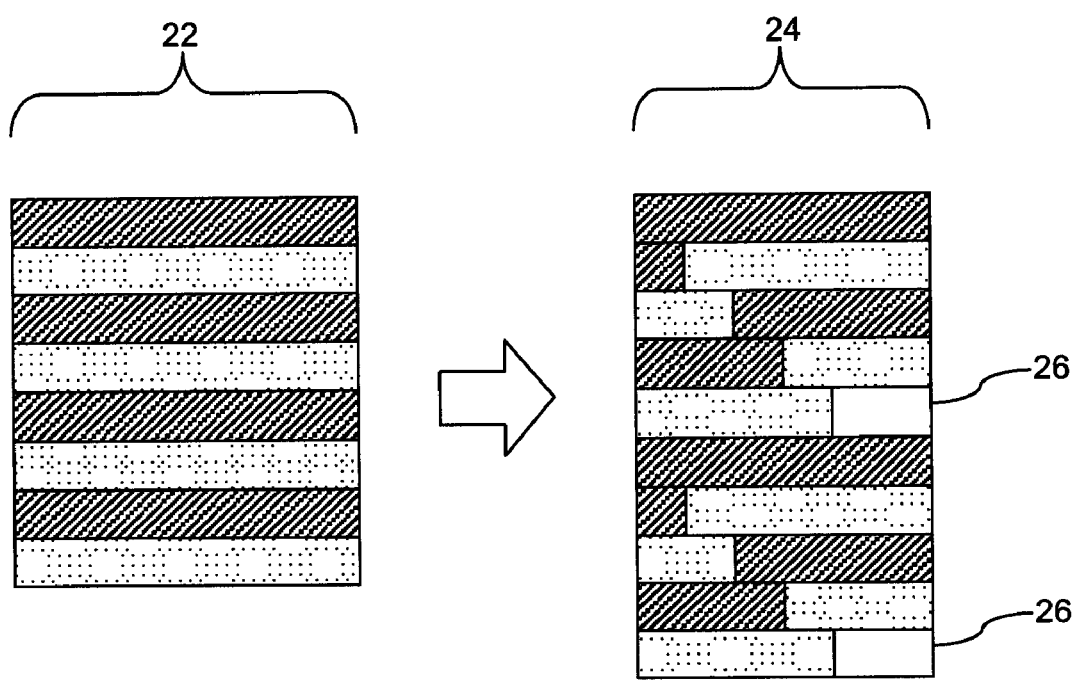
FIG. 2 is a schematic diagram of data being stored in sectors of a disk drive.

FIG. 2 shows an example mapping of data blocks (22) into sectors (24) of the storage device (16). In this example, the control device (14) is arranged, when determining the specific number n of blocks, n always being greater than 1, to access a stored value of n. In this example, the value of n is set at the integer four. This diagram is not to scale, and the alternate data blocks (22) have been marked differently, purely for the purpose of illustration of the concept of the invention. As can be seen in the Figure, the data blocks (22) are a larger size than the sectors (24) into which they are being written. The control device (14) is carrying out a mapping function of the data block (22) into the sectors (24).

The control device (14) is providing a hybrid mapping. It is based on an assumption that for example, it is highly likely that a specific number of blocks will always be read or written together. If an application that is communicating with the control device (14) will only read or write 524 byte blocks in groups of 4 to a disk drive (16) with a sector size of 512 bytes, an appropriate mapping (where n=4) would be:

Block A occupies from Sector 01 offset 00 to Sector 02 offset 12

Block B occupies from Sector 02 offset 13 to Sector 03 offset 24

Block C occupies from Sector 03 offset 25 to Sector 04 offset 36

Block D occupies from Sector 04 offset 37 to Sector 05 offset 48

Block E occupies from Sector 06 offset 00 to Sector 07 offset 12

Block F occupies from Sector 07 offset 13 to Sector 08 offset 24

Block G occupies from Sector 08 offset 25 to Sector 09 offset 36

Block H occupies from Sector 09 offset 37 to Sector 10 offset 48

With this mapping, reading or writing any of the 4-block groups will never include data from outside the group, but capacity is only sacrificed on every fourth sector of the storage device, which could be a SATA disk drive. Obviously if the group is much larger, then the mapping approaches the maximum capacity mapping. Effectively blocks of data are written consecutively into consecutive sectors, without any breaks between them, for a predefined number of blocks, the number n. When this number of blocks has been written into the memory of the storage device, then when the next block is written, the storage device will start at the beginning of the next sector. This hybrid solution does not waste as much memory as the known solution of beginning each new block at the start of a sector, nor does it have the speed impact of the known solution of simply writing the blocks into memory consecutively.

Advantageously, the step of determining the specific number n of blocks, where n is greater than 1, comprises accessing a stored value of n. This provides the simplest implementation of the method of writing the blocks of data into the memory sectors. The number n, which defines how many blocks are written consecutively before moving to the start of the next sector, can be stored and recalled as needed each time a set of blocks are committed to the memory of the storage device.

The result of this mapping can be seen in the sectors (24) in FIG. 2, where every fifth sector has an empty section (26). The control device (14) is storing four blocks (22) consecutively onto consecutive sectors (24), such that each block (22) begins directly after the previous block (22) ends, then repositioning the storing at the beginning of the next sector 24, and finally storing a further four blocks (22) consecutively onto consecutive sectors (24), again such that each block (22) begins directly after the previous block (22) ends. This pattern is repeated until all of the data received by the control device (14) from the external application has been written into memory. This provides an efficient use of the storage device (16), while ensuring that, on average, the amount of time consumed in future write operations to the storage device (16), is kept to a minimum.

Figure 3:
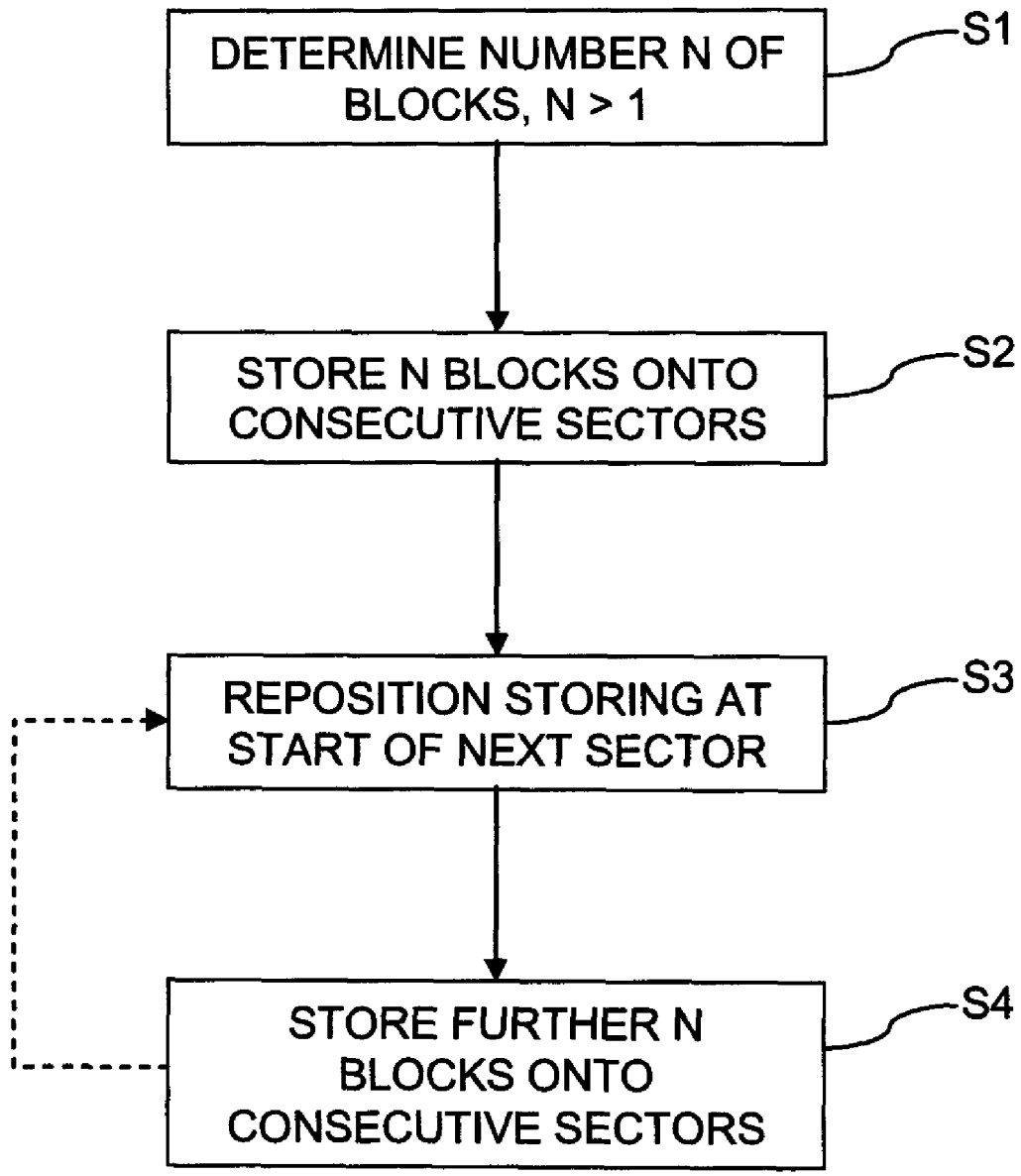
FIG. 3 is a flowchart of a method of storing data.

The method of storing the data blocks (22) onto the sectors (24) of the storage device (16) is summarized in FIG. 3. The process comprises, step S1, determining a specific number n of blocks (22), where n is greater than 1, step S2 storing n blocks (22) consecutively onto consecutive sectors (24), such that each block (22) begins directly after the previous block (22) ends, step S3, repositioning the storing at the beginning of the next sector (24), and storing a further n blocks (22) consecutively onto consecutive sectors (24), such that again each block (22) begins directly after the previous block (22) ends. The final steps S3 and S4 are repeated until all of the data blocks (22) that need to be stored are written to the memory of the storage device (16).

In the discussion of the system (10) above, it has been assumed that the value of n has been stored for a specific application. However, the control device (14) can be arranged, when determining the specific number n of blocks (22), where n is greater than 1, to generate read and write requests for the storage device (16) to determine an optimum value of n. This can either be done offline as a test session or during an initiation process as an application first interacts with a storage device (16). Typical data loads can be stored onto the sectors (24) of the storage device (16) using different values of n, and then read and write requests can be made to identify which is the most efficient value of n for the specific application. A predetermined list of values of n such as 4, 6, 8 and 10 could be used, with the control device (14) ultimately determining the preferred option. The system (10) can further comprise a suitable user interface, which can be arranged to receive a user input specifying the number n.

It is assumed that the number n remains constant for a specific application, but there is no reason why this should be the case. In fact, the control device (14) can be further arranged to change the number n to a new value m, and to store m blocks (22) consecutively onto consecutive sectors (24), such that each block (22) begins directly after the previous block (22) ends, to reposition the storing at the beginning of the next sector (24), and to store a further m blocks (22) consecutively onto consecutive sectors (24), such that each block (22) begins directly after the previous block ends (24). This may optimise the storage for a specific application that stores data in different ways for different components within the application. In particular, this method can be utilized to use different values of n for different storage devices (16) within the array (12).

In one embodiment, the value of n that is used in the writing of data to memory need not stay the same. Different application using the same storage device could commit data blocks to that storage device using different values of n, thereby choosing the value of n that best suits the subsequent read and write requests of the different applications. Indeed the same application could use different values of n in different situations, depending upon the needs of different parts of the overall application.

Figure 4:
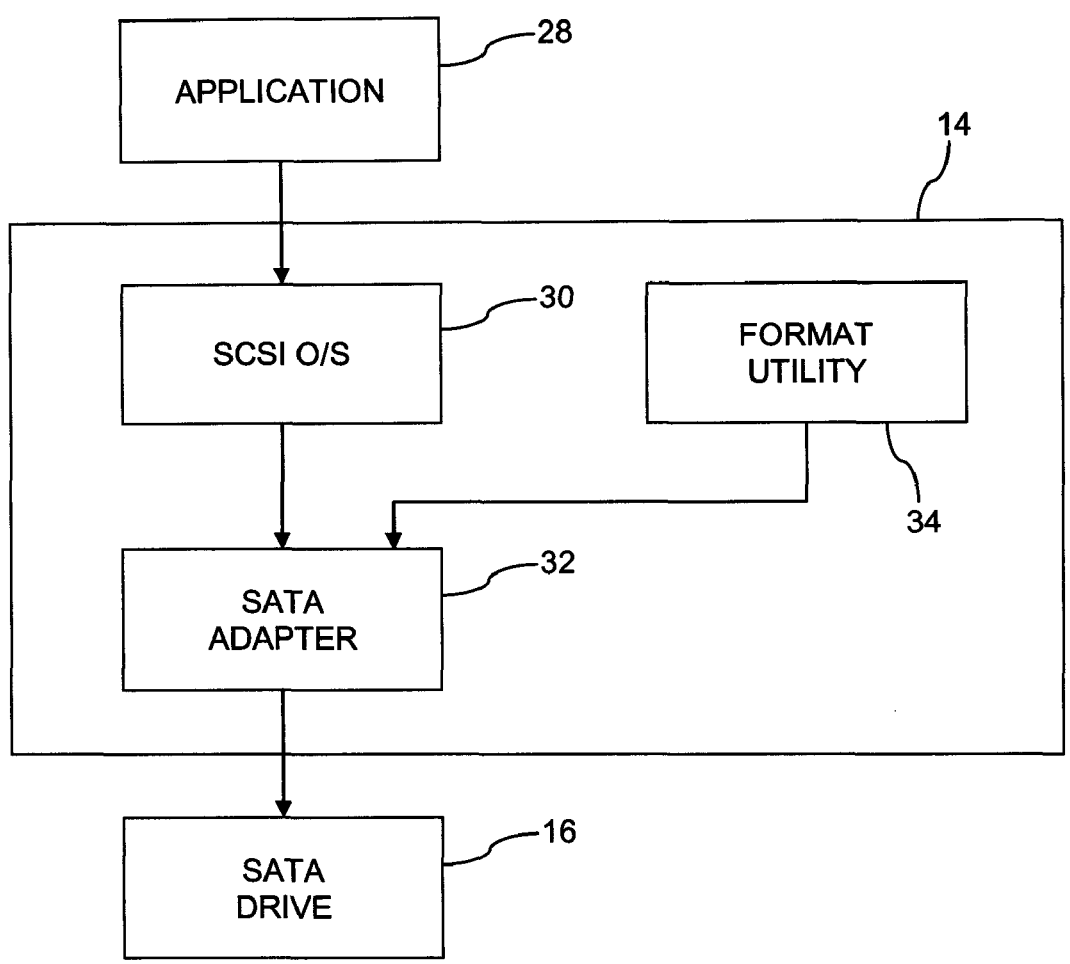
FIG. 4 is a schematic diagram of a further embodiment of the system for storing data.

The embodiment described above with reference to FIGS. 1 to 3 supports a mapping being defined during a SCSI Format Unit operation. FIG. 4 shows schematically how this embodiment would be implemented. The Format Unit command includes many options for defining precisely the required data format, and more importantly it also provides "Vendor Unique" parameters to define special requirements. It is possible to define Vendor Unique values to produce a mapping layer optimized to any of the characteristics illustrated above, or indeed to further derive settings. If the function which implements the mapping layer is aware of the Vendor Unique options on the Format Unit command, then a simple Utility program could send down the appropriate Format Unit command to set the required mapping, and all of this would be transparent to the SATA drive. Implementation of this method would allow a user to "try out" different mappings under various typical workloads, and select the optimum for each drive.

In the embodiment of FIG. 4, an application (28) communicates with the control device (14) over the external bus (20). The application (28) connects directly to the SCSI operating system (30) with read/write volumes. The SCSI O/S (30) sends SCSI block commands to a SATA adapter (32). The adapter (32) incorporates a mapping layer as a firmware function. The control device (14) also includes a format utility (34), which sends the Format Unit command mentioned above to the adapter (32), which transfers the modified mapping to the mapping layer. The layer, within the adapter (32), is connected directly to the SATA drive (16) over the internal bus (18).

The Format Unit command is additionally used to select the required 512/524 sector mapping method. This can be achieved in the CDB Format as follows:

| Byte | Bit 7 | 6 | 5 | 4 | 3 | 2 | 1 | 0 |
|---|---|---|---|---|---|---|---|---|
| 0 | | | | COMMAND OPCODE = 04 h | | | | |
| 1 | FMTPINFO | RTO_REQ | LONGLIST | FMTDATA | CMPLST | DEFECT LIST FORMAT | | |
| 2 | | | | MAP | | | | |
| 3 | | | | Obsolete | | | | |
| 4 | | | | | | | | |
| 5 | 0 | 0 | 0 | 0 | 0 | 0 | 0 | 0 | where Map requires the value of n where it represents the number of blocks written into consecutive sectors, before repositioning at the start of the next sector. For example, where n=0 to 255, the value of n at zero implies an alignment after 256 blocks).

The mapping strategy selection defined by the number n depends upon the specific embodiment of the application that is writing to the storage device. Advantageously, the methodology further comprises receiving a user input comprising the number n. This step in the invention is to allow the user to select an appropriate mapping based on the application intended for the storage device, which may be a SATA disk drive. The actual mapping is implemented outside of the SATA drive so there is no effect on the drive itself, meaning that the same SATA drive can be effectively tuned for several different applications.

SATA Disk Drive mapping layers can be implemented anywhere in the system between the application and the SATA drive interface—a common choice is to implement in the disk adapter or in the device driver, or even in the application itself. One very popular design implements a SCSI command architecture above the SATA drive by intercepting all block commands and translating addresses into SATA sector addresses. The mapping layer is part of the SATA adapter or "bridge" and is normally a fixed mapping similar to the "max capacity" arrangement described above.

The method disclosed here would allow the mapping to be defined during a SCSI Format Unit operation. The Format Unit command includes many options for defining precisely the required data format, and more importantly it also provides "Vendor Unique" parameters to define special requirements. It is a simple matter to define Vendor Unique values to produce a mapping layer optimised to any of the characteristics illustrated above, or indeed to further derivative settings. If the function which implements the mapping layer is aware of the Vendor Unique options on the Format Unit command, then a simple Utility program could send down the appropriate Format Unit command to set the required mapping, and all of this would be transparent to the SATA drive. Implementation of this method would allow a user to "try out" different mappings under various typical workloads, and select the optimum for each drive. For the purposes of this description, a computer readable medium is any apparatus that can contain or store a program for use by or in connection with an instruction execution system, apparatus, or device.

Advantage Over the Prior Art

Owing to the invention, it is possible to provide a storage solution that is able to maximise the amount of storage space used in the storage device, without having an adverse effect on the speed at which data can be written onto the storage device in future write instructions. This method and system specifies the key considerations in the design of the mapping layer, identifies a "hybrid" solution for specific workloads, and proposes a simple method for selection of the most appropriate mapping layer for the intended application. The invention essentially provides a middle ground where some capacity is sacrificed to ensure best performance in a specific workload.

Alternative Embodiments

It will be appreciated that, although specific embodiments of the invention have been described herein for purposes of illustration, various modifications may be made without departing from the spirit and scope of the invention. In particular, the step of determining the specific number n of blocks, where n is greater than 1, can comprise generating read and write requests for the storage device to determine an optimum value of n. The configuration of the storage device and the control device can be such that at the initiation of an application writing to the storage device, the number n is not yet known. In this case a method is needed to determine a value of n that will deliver a specific advantage. This can be done by generating a series of write requests using different values of n and then testing the speed of the transactions using further read and write requests. An optimum value of n can then be determined on the basis of the best performance of the read and writes relative to the different values of n used in this test phase. Accordingly, the scope of protection of this invention is limited only by the following claims and their equivalents.

We claim:

1. A method of storing data blocks onto sectors of a storage device comprising
   determining a specific number of blocks, wherein the number is greater than 1;
   storing the determined number of blocks consecutively onto consecutive sectors, such that each block begins directly after a previous block ends,
wherein the size of a block is not a multiple of the size of a sector such that the last sector that data is stored in is not filled; and
   storing a further number of blocks, starting from the beginning of a next sector, consecutively onto consecutive sectors, such that each block begins directly after the previous block ends.

2. The method according to claim 1, wherein the step of determining the specific number of blocks includes accessing a stored value of the number.

3. The method according to claim 2, wherein the number is the integer four.

4. The method according to claim 1, wherein the step of determining the specific number of blocks includes generating read and write requests for the storage device to determine an optimum value of the number.

5. The method according to claim 1, further comprising receiving a user input comprising the number.

6. The method according to claim 1, further comprising changing the number of specified blocks to a new value, and storing the new value of blocks consecutively onto consecutive sectors, such that each block begins directly after the previous block ends, and storing a further specified quantity of blocks of the new value, starting from the beginning of the next sector, consecutively onto consecutive sectors, such that each block begins directly after the previous block ends.

7. A system for storing data blocks onto sectors of a storage device, comprising:
   a control device in communication with a storage device, the control device arranged to:
      determine a specific number of blocks, wherein the number is greater than 1;
      store the determined number of blocks consecutively onto consecutive sectors, such that each block begins directly after a previous block ends, wherein the size of a block is not a multiple of the size of a sector such that the last sector that data is stored in is not filled, and
      store a further number of blocks, starting from the beginning of a next sector, consecutively onto consecutive sectors, such that each block begins directly after the previous block ends.

8. The system according to claim 7, wherein the control device is arranged to access a stored value of the specified number of blocks when determining the specific number of blocks.

9. The system according to claim 8, where the specified number of blocks is the integer four.

10. The system according to claim 7, wherein the control device is arranged to generate read and write requests for the storage device to determine an optimum value for the specified number of blocks, when determining the specific number of blocks, where the number of blocks is greater than 1.

11. The system according to claim 10, and further comprising a user interface arranged to receive a user input comprising the number of specified blocks.

12. The system according to any one of claims 7, wherein the control device is further arranged to change the specific number of blocks to a new value, and to store the new value of blocks consecutively onto consecutive sectors, such that each block begins directly after the previous block ends, and to store a further quantity of the new value of blocks, starting from the beginning of the next sector, consecutively onto consecutive sectors, such that each block begins directly after the previous block ends.

13. A computer program product on a computer readable medium comprising
   instructions to store data blocks onto sectors of a storage device, the instructions comprising:
      instructions to determine a specific number of blocks, wherein the number is greater than 1;
      instructions to store the specific number of blocks consecutively onto consecutive sectors, such that each block begins directly after a previous block ends, wherein the size of a block is not a multiple of the size of a sector such that the last sector that data is stored in is not filled;
      and
      instructions to store a further number of blocks, starting from the beginning of a next sector, consecutively onto consecutive sectors, such that each block begins directly after the previous block ends.

14. The computer program product according to claim 13, wherein the instructions to determine the specific number of blocks includes accessing a stored value of for the specific number.

15. The computer program product according to claim 13, where the specific number is the integer value four.

16. The computer program product according to claim 13, wherein the instructions to determine the specific number of blocks includes generating read and write requests for the storage device to determine an optimum value of the specific number of blocks.

17. The computer program product according to claim 13, further comprising instructions to receive a user input comprising the specific number of blocks.

18. The computer program product according to claim 13, further comprising instructions to change the specific number to a new value, and storing the new value of blocks consecutively onto consecutive sectors, such that each block begins directly after the previous block ends, and store a further quantity of the new value of blocks, starting from the beginning of the next sector, consecutively onto consecutive sectors, such that each block begins directly after the previous block ends.

* * * * *